United States Patent
Chandwani et al.

(10) Patent No.: US 7,558,849 B2
(45) Date of Patent: Jul. 7, 2009

(54) HARDWARE MANAGEMENT MODULE

(75) Inventors: Neelam Chandwani, Portland, OR (US); Udayan Mukherjee, Portland, OR (US); Chetan Hiremath, Portland, OR (US); Rakesh Dodeja, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 11/201,608

(22) Filed: Aug. 10, 2005

(65) Prior Publication Data

US 2007/0038732 A1    Feb. 15, 2007

(51) Int. Cl.
G06F 15/173    (2006.01)
H02H 5/04    (2006.01)
H05K 7/20    (2006.01)
G06G 19/00    (2006.01)
G06F 11/00    (2006.01)

(52) U.S. Cl. .................. 709/223; 361/103; 361/688; 700/130; 370/219

(58) Field of Classification Search ........................ None
See application file for complete search history.

(56) References Cited

U.S. PATENT DOCUMENTS

| | | | |
|---|---|---|---|
| 2003/0058618 A1* | 3/2003 | Soetemans et al. | 361/688 |
| 2003/0084359 A1* | 5/2003 | Bresniker et al. | 713/324 |
| 2004/0095881 A1* | 5/2004 | Borella et al. | 370/219 |
| 2004/0162927 A1* | 8/2004 | Benson et al. | 710/301 |
| 2004/0230866 A1* | 11/2004 | Yates et al. | 714/25 |
| 2005/0228531 A1* | 10/2005 | Genovker et al. | 700/130 |
| 2006/0023384 A1* | 2/2006 | Mukherjee et al. | 361/103 |
| 2006/0262781 A1* | 11/2006 | Campini et al. | 370/389 |

* cited by examiner

*Primary Examiner*—Wen-Tai Lin
(74) *Attorney, Agent, or Firm*—Blakely, Sokoloff, Taylor & Zafman LLP

(57) ABSTRACT

A hardware management module is enabled to perform hardware management for a modular platform system that includes a plurality of modular platform shelves coupled via one or more communication links in a network. Hardware management to include monitoring board interfaces resident on one or more backplanes within the plurality of modular platform shelves, detecting when a board is received and coupled to a board interface and performing one or more hardware management functions to include obtaining field replaceable unit information from the detected board.

27 Claims, 6 Drawing Sheets

HARDWARE MANAGEMENT MODULE

BACKGROUND

Modular platform systems are typically used in areas where reliability is increased and cost reduced by the use of interoperable pieces or hardware. Such interoperable hardware may include modular platform shelves or chasses. These modular platform shelves include one or more backplanes that receive and couple to other interoperable hardware such as circuit boards or "boards". These boards may include, but are not limited to blades, carrier boards, processing boards, interconnects, etc. Other interoperable hardware that a backplane may receive and couple to include components such as fans, power equipment modules (PEM), field replaceable units (FRUs), alarm boards, etc.

Generally, modular platform system architectures require a set of manageability features in order to manage interoperable hardware in a modular platform shelf. Manageability features may include, for example, negotiating power budgets between boards and/or components, monitoring and controlling cooling, hot-swap management, sequencing power up and power down processes, alerting on errors and other capabilities that may be related to security.

Dedicated hardware solutions exist to perform most of the hardware manageability features or functions on interoperable hardware. One solution has each modular platform shelf implement a set of mandatory shelf manageability features as described, for example in an industry standard known as the PCI Industrial Computer Manufacturers Group (PICMG), Advanced Telecommunications Computing Architecture (ATCA) Base Specification, PICMG 3.0 Rev. 1.0, published Dec. 30, 2002, and/or later versions of the specification ("the ATCA specification"). Thus, for example, in an ATCA modular platform system or rack that includes a plurality of modular platform shelves or chasses, each shelf in the system may include one or more dedicated hardware management modules. Each hardware management module may reside on a board coupled to a backplane within each modular platform shelf to implement the set of mandatory hardware management functions.

DETAILED DESCRIPTION

As mentioned in the background, modular platform systems are typically used in areas where reliability is increased and cost reduced by the use of interoperable hardware. However, using dedicated hardware resources at each modular platform shelf to perform most hardware management functions may add substantially to the cost of operating and maintaining a modular platform system. Although industry standards, such as ATCA, dictate the management functions that are to be performed on each shelf, the way these functions are implemented may vary. As a result, the various hardware implementations may create interoperability issues and thus reduce the reliability of these types of modular platform systems. Consequently, the use of dedicated hardware resources at each modular platform shelf may negatively impact the cost effectiveness and reliability of a modular platform system.

Figure 1:
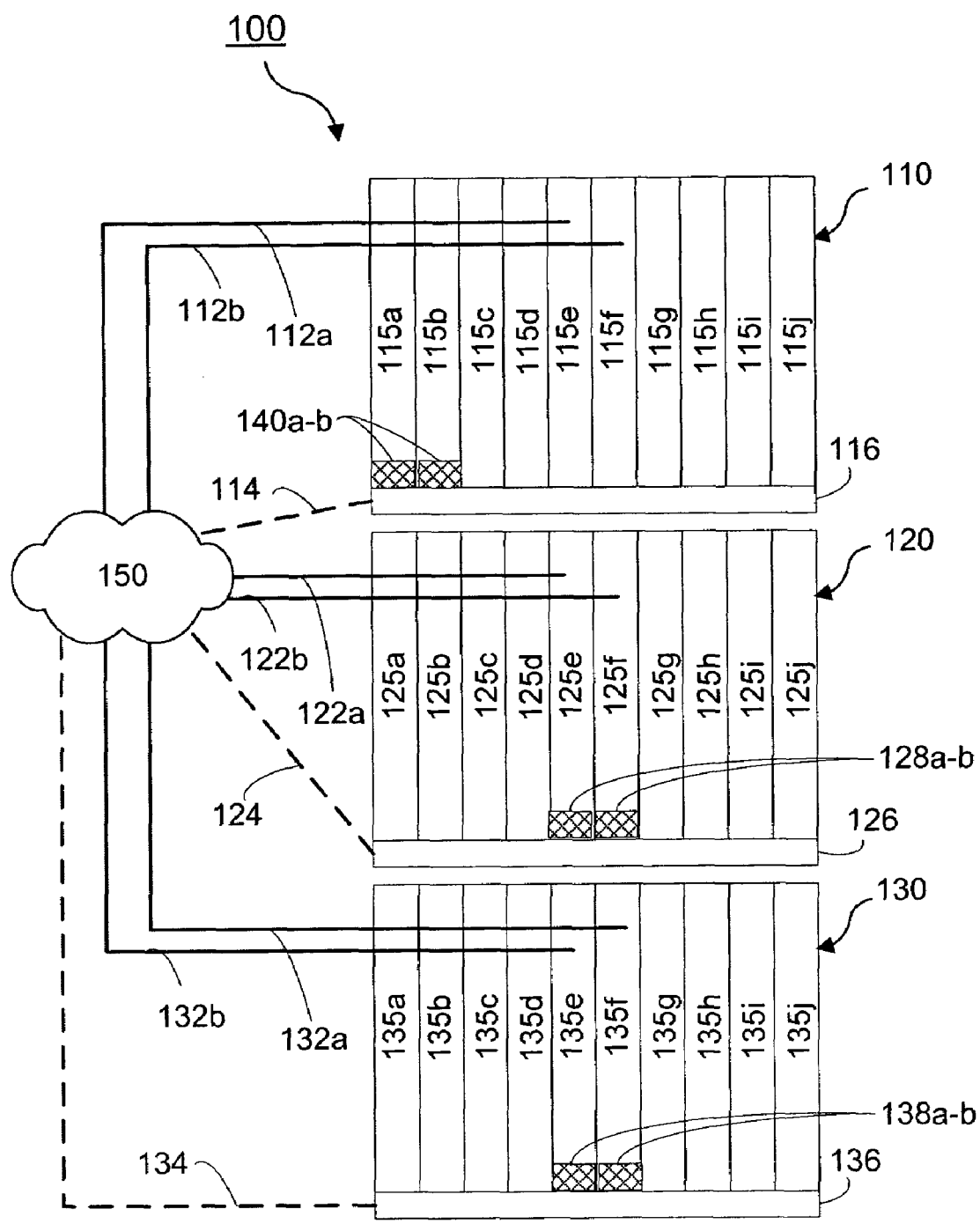
FIG. 1 is an example illustration of a modular platform system including communication links for a network to a plurality of modular platform shelves.

FIG. 1 is an example illustration of a modular platform system 100 including communication links for a network to modular platform shelves 110, 120 and 130. As depicted in FIG. 1, network 150 includes communication links 112*a-b*, 122*a-b* and 132*a-b* coupled to modular platform shelves 110, 120 and 130. In addition, communication links 114, 124, and 134, may also couple these modular platform shelves to network 150.

In one example, network 150 may be a network accessible only by modular platform shelves 110, 120 and 130 via the communication links depicted in FIG. 1. In another example, network 150 may also be accessible to elements remote to modular platform system 100. This remote access, for example, may be via network 150 coupling to wired and/or wireless local area networks (LANs), metropolitan area networks (MANs), wide area networks (WANs) or the like.

In one implementation, modular platform shelves 110, 120 and 130 each include one or more board interfaces resident on a backplane within a modular platform shelf. These board interfaces, for example, may receive and couple a board to the backplane. FIG. 1 depicts the modular platform shelves having boards received and coupled to these interfaces. For example, modular platform shelf 110 includes boards 115*a-j*, modular platform shelf 120 includes boards 125*a-j* and modular platform shelf 130 includes boards 135*a-j*. Although this disclosure is not limited to the number of boards and/or board interfaces depicted in FIG. 1. Modular platform shelves 110, 120 and 130 may also include one or more component interfaces (not shown) that may receive and couple a component (e.g., PEM, FRU, fan, alarm board, etc.) to a backplane within these modular platform shelves.

In one implementation, modular platform shelf 110 includes boards that support one or more hardware management modules (e.g., hardware management modules 140*a-b*). Hardware management modules, for example, may perform hardware management for all modular platform shelves in modular platform system 100. This hardware management may include, but is not limited to, monitoring board interfaces resident on backplanes within modular platform shelfs, detecting when a board is received and coupled to a board interface and performing one or more management functions on the board. These hardware management functions are described in greater detail below when describing FIGS. 4-6.

In one example, hardware management modules 140*a* and 140*b* reside on boards 115*a* and 115*b*, respectively. These boards may be in communication via backplane 116 with one or more boards coupled to network communication links. For example, FIG. 1 depicts communication links 112*a* and 112*b* coupled to boards 115*e* and 115*f*, respectively. As a result, management modules 140*a* and 140*b* may couple to network 150 via these boards. Boards 115*e-f* may be, for example, switch boards that facilitate the routing of data and/or instructions between modular platform shelf 110 and elements within modular platform system 100 or to elements remotely located outside of modular platform system 100.

In another example, hardware management modules 140*a-b* couple to network 150 directly through backplane 116. For this example, communication link 114 couples to a management bus within backplane 116. This management bus may couple directly to hardware management module 140a-b. As a result, communication link 114 may serve as a direct link to network 150 for hardware management module 140a-b.

In one example, modular platform shelves 120 and 130 include one or more network enabled shelf management controllers (NShMCs) that are network enabled by coupling to and/or being resident on a switch board coupled to network 150. Boards 125e-f in shelf 120 and boards 135e-f may be boards coupled to network 150 via communication links as depicted in FIG. 1. FIG. 1 also depicts these boards as including resident NShMCs 128a, 128b, 138a and 138b. These NShMCs may also couple to network 150 via communication links 124 and 134 through backplanes 126 and 136, respectfully.

In one implementation, NShMCs, facilitate the management of boards received and coupled to board interfaces resident on a given backplane in modular platform system 100. Hardware management modules 140a and 140b may communicate through network 150 to NShMCs located on modular platform shelves 120 and 130. This communication may facilitate the monitoring of board interfaces resident on backplanes 126 and 136 by hardware management modules 140a and 140b. As a result, these hardware management modules may detect (via one or more NShMCs) when a board is received and coupled to a board interface on backplanes 126 and 136 and then perform one or more management functions.

In one implementation, modular platform system 100 may be operated in compliance with the ATCA specification, although this disclosure is not limited to ATCA compliant modular platform systems. In this implementation, communication links 112a-b, 122a-b and 132a-b may be part of a base fabric located within backplanes 116, 126 and 132, respectively. This base fabric may use 10/100/1000 BASE-T Ethernet communication protocols ("Ethernet") to forward data and/or instructions between network 150 and the modular platform shelves containing these backplanes. Ethernet associated communication protocols, for example, as described in the Institute of Electrical and Electronics Engineers (IEEE) standard 802.3-2002 IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications, published August 2002, and/or later versions of the standard (the "Ethernet standard").

In another implementation, communication links 114, 124 and 132 may couple to a management bus located within backplanes 116, 126 and 136. One example of a management bus is described in the ATCA specification as an Intelligent Platform Management Bus (IPMB). According to the ATCA specification, an IPMB may be capable of providing out-of-band communication between boards and/or other components received and coupled to a modular platform shelf or a backplane within a modular platform shelf (e.g. backplane 126). This out-of-band communication may facilitate the management of boards and/or components received and coupled to a backplane. An ATCA IPMB complies and/or is compatible with the "Intelligent Platform Management Bus Communications Protocol Specification," Document Revision 1.0, published Nov. 15, 1999, and/or later versions of the standard (the "IPMB standard"). Additionally, an example communication protocol that may be used when communicating via an IPMB is described in the Intelligent Platform Management Interface (IPMI) Standard detailed in "Intelligent Platform Management Interface Specification Second Generation," Document Revision 1.0, dated Feb. 12, 2004, published by Intel, Hewlett-Packard, NEC, and Dell, and/or later versions of the standard (the "IPMI standard"). In other examples, out-of-band communication is achieved for non-ATCA modular platforms via a management bus, such as a multi-drop serial bus.

In one example, hardware management module 140a and/or 140b may forward data and/or instructions destined for NShMCs in modular platform shelves 120 and 130. The data and/or instructions may be routed first over a management bus in backplane 116 to communication link 114 coupled to network 150. Network 150 may contain a switch (not shown) to facilitate this routing of data and/or instructions over communication links coupled to management buses within each backplane in modular platform system 100.

Figure 2:
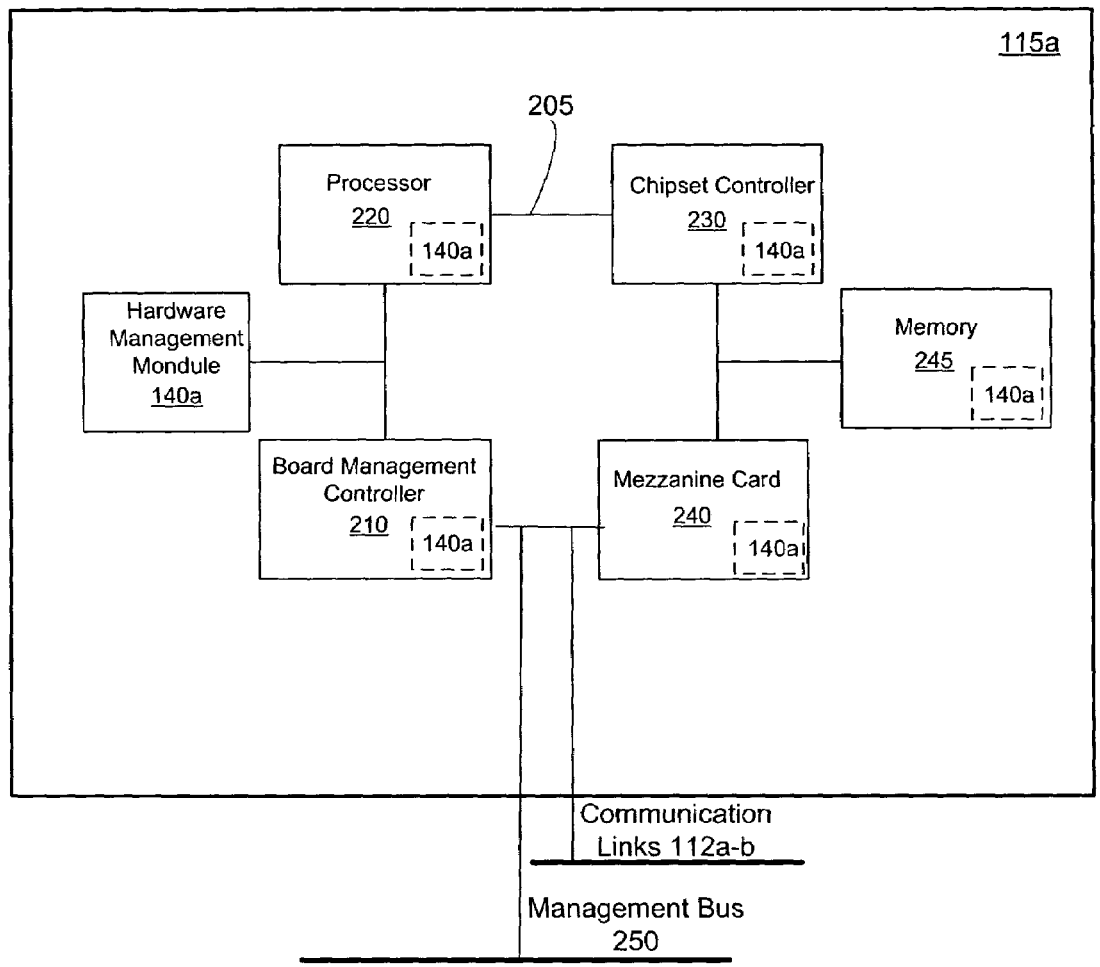
FIG. 2 is an example block diagram of a hardware management module on a board.

FIG. 2 is an example block diagram of a hardware management module 140a on board 115a. As depicted in FIG. 1, board 115a is received and coupled to backplane 116 in modular platform shelf 110. In one example, board 115a includes a hardware management module 140a. As introduced above, hardware management module 140a may perform hardware management for modular platform system 100. This hardware management may include, but is not limited to, monitoring board interfaces resident on backplanes 116, 126 and 136, detecting when a board is received and coupled to a board interface and performing one or more management functions on the board.

Hardware management module 140a may be implemented as one or more of an application specific integrated circuit (ASIC), special function controller or processor, field programmable gate array (FPGA), other hardware device, and firmware or software to perform at least the functions described in this disclosure.

FIG. 2 depicts hardware management module 140a as a separate component from and/or residing within one or more of a board management controller 210, a processor 220, a chipset controller 230, a mezzanine card 240 or a memory 245. These components of board 115a may all be coupled via communication channels 205. Communication channels 205, for example, may contain communication links (e.g., a management bus, fabric interfaces, etc.) to facilitate the forwarding of data and/or instructions between the components on board 115a and/or components remote to board 115a.

In one example, board 115a may be an ATCA compliant board where communication channels 205 include a board management bus (not shown) that couples to a management bus 250 in backplane 116. In this example, board management controller 210 may be an ATCA Intelligent Platform Management Controller (IPMC) and management bus 250 an IPMB for an ATCA complaint modular platform shelf 110. In addition, communication channels 205 may include communication links to a base fabric (not shown) in backplane 116 that may use Ethernet communication protocols to forward data and/or instructions to network 150, for example, via communication links 112a or 112b coupled to boards 115e or 115f.

Hardware manager module 140a may include a predefined and/or user definable set of manageability functions. To that end, hardware management module 140a may be capable of implementing one or more management policies, as may be defined by a user, which may be operable to determine which components of modular platform system 100 may provide hardware management functionality to boards and/or components within modular platform system 100. For example, hardware management module 140a may include one or more management policies within a memory (e.g., memory 245) responsive to and/or accessible by hardware management module 140a. A management policy may be in the form of a table in the memory. These policies may dictate which hardware management module in modular platform system 100 is an "active" or "master" and which hardware management module is the "standby" or "backup" hardware management module for modular platform system 100.

In one implementation, hardware management module 140a includes management policies which indicate it is the active hardware management module of modular platform system 100. In addition, hardware management module 140b in board 115b may include management policies which may indicate it is the standby hardware management module. In one example, hardware management module 140a transmits "heartbeats" to network 150 (e.g., through communication channels 305, backplane 116 and communication links 112a-b or 114). These heartbeats may be in the form of data packets transmitted using various communication protocols (e.g., IPMI, Ethernet). Hardware management module 140b may monitor these heartbeats (e.g., receiving and reading heartbeat data packets via communication links in backplane 116) and its management policies may include instructions to dynamically (e.g., during run-time) take over the role of the active hardware management module if the heartbeats are delayed or can't be detected.

In one example, one or more NShMCs in a modular platform system also include management policies (e.g., in a memory responsive to and/or accessible to an NShMC) that enable a recognition of what hardware management modules are active (e.g., through network broadcasts). For example, NShMC 128a monitors network 150 for network broadcasts (e.g., data packets transmitted via communication links 122a or 124) that may indicate that hardware management module 140a is the active hardware management module and that hardware management module 140b is the standby hardware management module.

In one example, NShMC 128a monitors the heartbeats of hardware management module 140a and/or 140b. In this example, NShMC 128a's management policies may include instructions to dynamically take over the role of the active hardware management module if the is monitored heartbeats are delayed or can't be detected.

Figure 3:
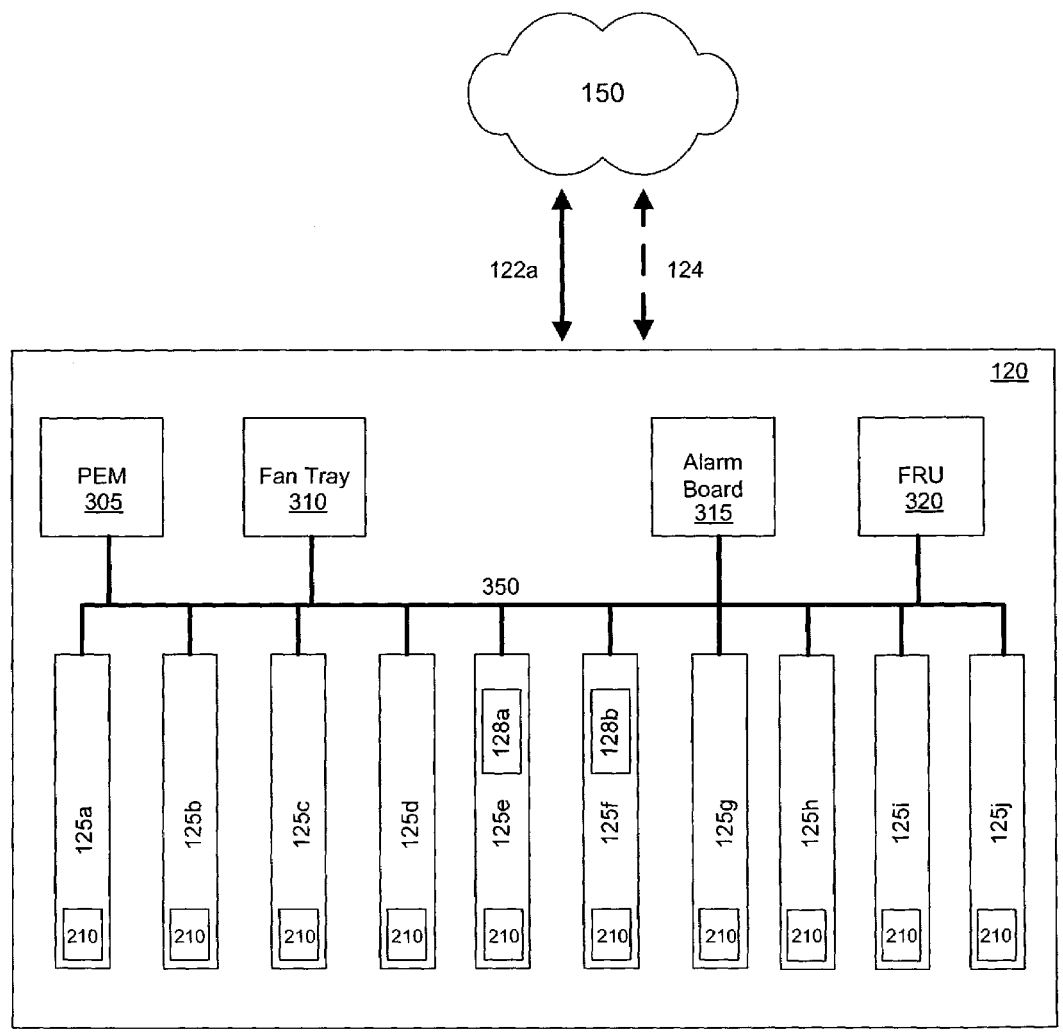
FIG. 3 is an example block diagram of a modular platform shelf coupled to the network.

FIG. 3 is an example block diagram of modular platform shelf 120 coupled to network 150. As depicted in FIG. 2, modular platform shelf 120 includes boards 125a-j received and coupled to backplane 126. Although not shown in FIG. 3, boards 125a-j may include a plurality of contacts capable of electrically and/or mechanically mating with an interface or slot on backplane 126. These contacts may include a contact to couple in communication to management bus 350.

In one implementation, each board may include a board management controller 210 similar to that described for board 115a. Board management controller 210 may forward data and/or instructions between boards and/or components coupled to management bus 350. For example, board 125e may forward data and/or instructions to board 125a. These instructions, for example, may include management and/or control instructions received either remotely (e.g., from hardware management module 140a-b) or received from another board coupled to backplane 126.

In one example, modular platform shelf 120 may also include a PEM 305 capable of providing power to modular platform shelf 120, a fan 310 to provide cooling of modular platform shelf 120, an alarm board 315 to provide visual notifications of fault conditions in modular platform shelf 120, and a FRU 320. FRU 320, for example may be a component to provide additional functionality to shelf 120 (e.g., additional input/output connections, memory storage or power). As depicted in FIG. 3, these components may be coupled to management bus 350.

In one example, modular platform shelf 120 operates in compliance with the ATCA specification. In that regard, management bus 350 may be an Intelligent Platform Management Bus (IPMB) and board management controller 210 may be an IPMC. However, this disclosure is not limited to ATCA compliant modular platform systems.

Although not shown in the FIG. 3, modular platform shelf 120 may also include other communication links using out of band management and/or control communication protocols, for example, serial communication protocols (e.g., Universal Asynchronous Receiver/Transmitter (UART)) and/or other communication protocols.

In one implementation, modular platform shelf 120 also includes one or more NShMCs, for example, NShMC 128a on board 125e and NShMC 128b on board 125f. NShMC 128a-b, for example, may facilitate hardware management module 140a-b's hardware management of boards and/or components received and coupled to modular platform shelf 120. NShMC 128a-b may be implemented in software or firmware, or a combination of both.

Although NShMC 128a is shown in FIG. 3 as residing on board 125e and NShMC 128b is shown as residing on board 125f, it is equally contemplated that NShMCs may reside on other boards and/or other components of modular platform shelf 120. For example, one or more NShMCs may alternatively reside in one or more integrated circuits, field programmable gate arrays (FPGA), control logic or processors residing on or responsive to any other board and/or component received and coupled to backplane 126.

In one embodiment, NShMC 128a-b may facilitate hardware management module 140a-b by monitoring board and/or component interfaces on backplane 126 via management bus 350. NShMC 128a-b may be capable of detecting when a board and/or component couples to backplane 126 (e.g., by monitoring interface impedance levels). Thus, NShMC 128a-b may facilitate hardware management module 140a-b's performance of one or more shelf management functions.

In one example, as mentioned previously, NShMC 128a-b may be network enabled. For example, a network interface resident on boards 125e and 125f may enable NShMC 128a-b to couple to network 150 via communication link 122a and to forward data and/or instructions from other boards, modules or components coupled to network 150 (e.g., hardware management module 140a-b). This network interface may comply, for example, with Ethernet associated communication protocols and/or other network communication protocols.

In one example, modular platform shelf 120 operates in compliance with the ATCA specification. As mentioned above in one example, communication links 122a-b may be part of a base fabric located within backplanes 116 and may use Ethernet communication protocols to forward data and/or instructions to network 150. In this example, NShMC 128a-b communicates with hardware management module 140a-b via communication link 122a coupled to the base fabric in backplane 126. NShMC 128a-b may include a base fabric interface (not shown) to translate or bridge any Ethernet related communication protocols. This bridging, for example, may enable NShMC 128a-b to bridge Ethernet communications received from hardware management module 140a to IPMI protocols. These IPMI protocols may then be used to forward data and/or instructions to facilitate the management of boards and/or components coupled to management bus 350 in backplane 126.

In one example, boards and/or modules (e.g., hardware management module 140*a-b*) in an ATCA compliant modular platform system (e.g., modular platform system 100) are capable of communicating IPMI messages over communication link 124 to NShMC 128*a-b*. For example, hardware management module 140*a* or 140*b* connects with NShMC 128*a-b* over a Remote Management Control Protocol (RMCP) session to send IPMI messages directed at the NShMC 128*a-b* and/or other boards received and coupled to backplane 126. For an RMCP defined session, the NShMC 128*a-b* may include an interface to perform all of the RMCP defined session management functionalities, discover messages that may require the NShMC to facilitate or perform one or more hardware management functions performed by the hardware management module and/or decide if the IPMI message needs to be forwarded to NShMCs on other boards. If forwarded, for example these NShMCs may also facilitate and/or perform at least a portion of the one or more management functions.

Figure 4:
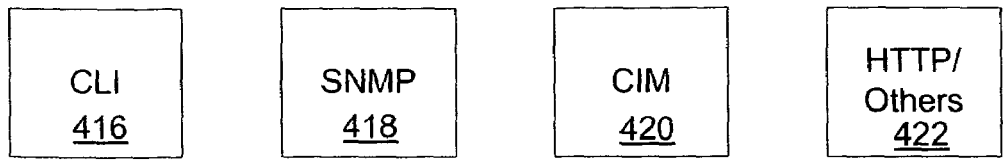
FIG. 4 is a block diagram of an example hardware management architecture.
Figure 4:
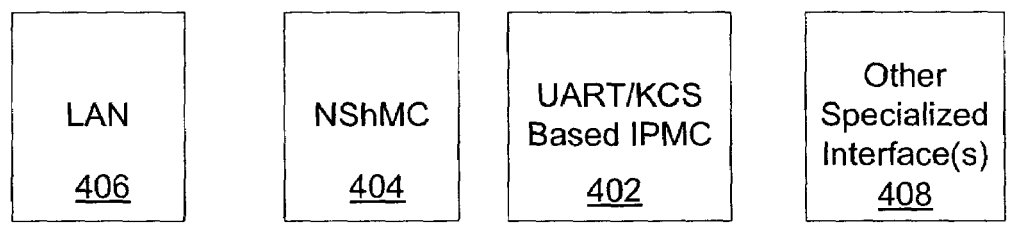

FIG. 4 is a block diagram of an example hardware management architecture 400. As mentioned above, a hardware management module may be implemented in firmware and/or software and is capable of performing one or more management functions.

In one example interface 402 includes instructions capable of interfacing hardware management module 140*a* to board management controller 210. Interface 402 may also permit hardware management module 140*a* to exchange data and/or instructions with one or more components and/or boards coupled to modular platform shelf 110 via management bus 250. Interface 402 may also provide a communication path for one or more other board management controllers (e.g., on boards 115*b-j*) and/or other components (e.g., PEMs, fans, FRUs, alarm boards, etc.) within modular platform system 100. As a result, interface 402 may be operable to communicate requests and information to the hardware management module 140 for management and/or control of modular platform system 100. Interface 402 may include a UART type interface, block transfer (BT) interface, a KCS (keyboard controller style) interface, and/or other interfaces.

In one implementation, an NShMC interface 404 is capable of providing an interface between the hardware management module 140 and one or more NShMCs within modular platform system 100. NShMC interface 404 may be capable of exchanging data and information using communications protocols that comply or are compatible with those used by the NShMCs over communication links in modular platform system 100 (e.g., Ethernet over communication links 122*a-b* or IPMI and RMCP over communication link 124).

In one example, a local area network (LAN) interface 406 is provided. LAN interface 406 is capable of communicating messages over LAN communication protocols. For example, management clients can connect with the hardware management module 140 over an RMCP session to send messages directed at the hardware management module 140 (e.g., through a base fabric communication link), or to be bridged over to a management bus on the backplane (e.g. management bus 250 in backplane 116). For an RMCP defined session, the LAN interface 406 may perform all of the RMCP defined session management functionalities, discover messages that may be forwarded to hardware management layers capable of processing requests, and/or decide if the message needs to be bridged over to communication protocols used on management bus 250 (e.g., IPMI).

Other specialized interfaces 408 may also be utilized. For example, since the hardware management module 140*a* may be deployed on different hardware configurations (i.e., in different components on board 115*a*), one such configuration could be a dedicated hardware management configuration. In this case, the specialized interface 408 may be provided through a specific hardware driver that provides connectivity to the management bus 250 and may also provide an interface to the Interface Abstraction Layer 410. This driver may provide the same functionality as provided by a KCS driver which may provide consistent functionality across multiple hardware interface drivers by abstracting out specifics of hardware interaction.

In one implementation, the interface abstraction layer 410 provides a programming interface to the hardware management module 140 (regardless of the type of hardware or software interface coupled to the interface abstraction layer 410), and exchanges commands and data with one or more different interfaces 402, 404, 406, 408. As a result, the interface abstraction layer 410 may allow the hardware management module 140 to reside on any hardware, and may operate to abstract out the underlying hardware interface used to obtain access to management bus 250 and board controller 210. Hence, while providing flexible interaction with different hardware interfaces to perform management functions, interface abstraction layer 410 may permit other functionalities of the hardware management architecture 400. The interface abstraction layer 410 may also provide message formatting, message tracking, and response matching for requests.

The interface abstraction layer 410 may also perform additional functions. For example, interface abstraction layer 410 determines if a request needs to be formatted as a local request to board management controller 210 or as a message that needs to be bridged by the board management controller 210 over to management bus 250. Interface layer 410 may also include application programming interfaces (APIs) to provide integration of a plurality of different hardware interfaces into the hardware management module 140. It should be noted that since the architecture 400 (FIG. 4) may provide a flexible and scalable framework, the same model can be extended to provide manageability functions for different hardware platforms beyond modular platform systems.

In one implementation, the hardware management abstraction layer 412 provides an interface layer for the instrumentation stack 414. The hardware management abstraction layer 412 may provide an abstraction through an API that may be capable of communicating with instrumentation stack 414, which can either reside on a memory (e.g., memory 245) or on a remote computing resource. This mechanism permits, for example, a relatively small bandwidth board controller and/or mezzanine card and/or processor to provide a subset of hardware management functionality while the rest of the instrumentation resides on a network management system (e.g., coupled to network 150). The instrumentation stack 414 may provide health tracking of each board, correlation of errors, and/or other capabilities.

In one example, the hardware management abstraction layer 412 provides a programming interface to the instrumentation stack 414. Having a programming interface at the hardware management abstraction layer 412 may allow the hardware management module 140 to reside on any hardware entity in communication with this programming interface. Thus, hardware management module 140 may interact with the instrumentation stack 414, regardless of where the hardware management module 140 resides.

In one implementation, the hardware management module 140 may be implemented on a board such as a processing blade, but the instrumentation stack resides on another board. Alternatively, hardware management module 140 may reside on a dedicated processor (e.g., a service processor) on a board and the instrumentation stack resides on another processor (e.g., a host processor) of the same board.

In one example, the instrumentation stack layer 414 capable of communicating with one or more interfaces such as a command line interface (CLI) 416, simple network management protocol (SNMP) interface 418, customer information model (CIM) interface 420, and hyper text transfer protocol (HTTP) and others interface 422. The instrumentation stack 414 may also provide a programming interface, and a proprietary interface may also be implemented that may be used in a particular operating environment and/or may be selectively enabled remotely as a service that may be purchased for a certain period of time.

In one implementation, hardware management architecture 400 is implemented within the components illustrated in FIG. 2. In other implementations, hardware management architecture 400 is implemented within NShMCs as illustrated in FIG. 3. In yet other implementations, hardware management architecture 400 is implemented remotely by network management systems coupled to modular platform system 100 through network 150.

Figure 5:
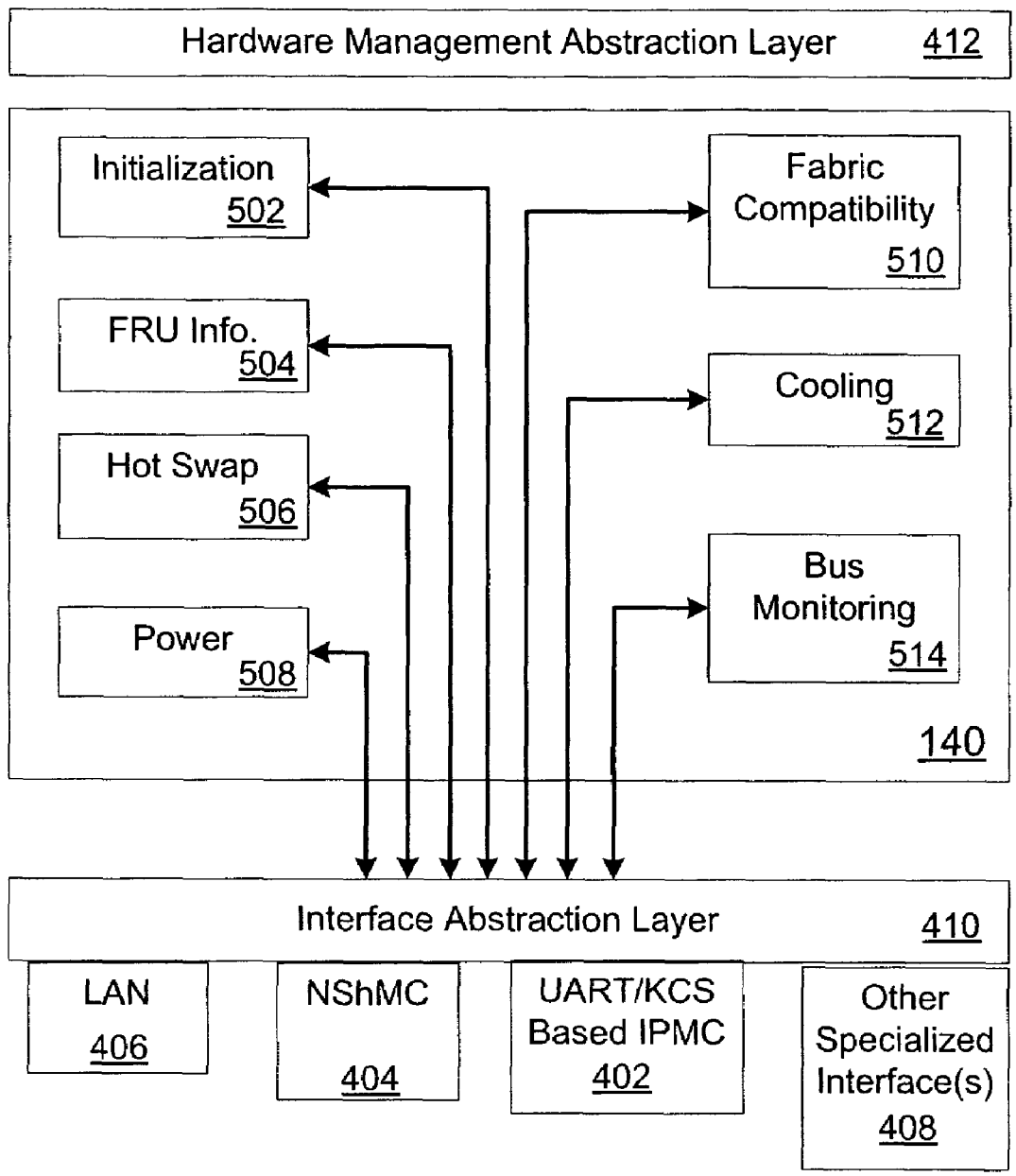
FIG. 5 is a block diagram illustrating example management functionality of the hardware management module.

FIG. 5 is a block diagram illustrating example management functionality of hardware management module 140 implemented, for example, in an ATCA compliant modular platform system 100. Example management functions include initialization 502, FRU information management 504, hot swap management 506, power management 508, fabric compatibility management 510, cooling management 512, and bus monitoring 514. Like parts of FIG. 5 and FIG. 4 are labeled similarly, and hence any repetitive description of such components is omitted for clarity.

In one example, an initialization function 502 is performed by IPMCs (e.g., board controller 210) on ATCA compliant boards received and coupled to modular platform system 100. These IPMCs may initialize themselves and/or receive commands to initialize from other boards or components (e.g., via a management bus or network 150). This initialization may enable the IPMC to obtain policy data to indicate if the board is to perform hardware management for the modular platform shelf and/or at least portions of the modular platform system. If the board is instructed, by way of policy data, to perform hardware management, the policy data may also indicate which component(s) on the board which includes and/or support a hardware management module (e.g., processor, IPMC, mezzanine card, chipset controller).

In one implementation, a processor (e.g., processor 220) is designated to provide hardware management. The IPMC, in this implementation, may be capable of providing instructions to one or more boards in modular platform system 100 that may require remote access (e.g., through network 150). Once initialized, the processor that is designated to provide hardware management (as may be indicated in policy data setting), may begin hardware management functions to the boards and/or components in modular platform system 100. This initialization process may permit boards that boot off a network to communicate with remote storage devices to obtain access to their operating system images from the network.

Communication with such remote storage devices may comply or be compatible with an Ethernet or Internet Protocol (IP) and/or other communication protocols.

In one example, boards and/or components received and coupled to interfaces on modular platform system 100 contains information or data that characterizes various configuration parameters. This information, in one example, is referred to by the ATCA specification as "FRU information." In one implementation, the initialization function 502 may enable the hardware management module 140 to detect one or more boards and/or components containing FRU information. This FRU information may include information to be used for power sequencing, power budgeting, addressing, and determining interface or slot descriptions. This FRU information may be accessible over an IPMB in a backplane within a modular platform shelf.

In one ATCA implementation, FRU information management function 504 may scan for IPMI enabled boards and/or components at known IPMB address ranges using the GetDeviceID IPMI command or the BroadcastGetDeviceID IPMI command. On successful discovery of IPMI enabled boards and/or components at a given IPMB address, a response to a GetAddressInfo IPMI command may indicate if the board and/or component provides FRU information. On discovery of FRU information, FRU information management function 504 may read the FRU information from this board and/or component. This FRU information may include a power description record that describes the power needs of the board and/or component. Hardware management module 140 may use this information to manage power budgets within a modular platform shelf and/or the modular platform system.

In one implementation, additional FRU information from the board and/or component may include backplane point-to-point interface descriptor records. These descriptor records may describe connectivity requirements for the board and/or component. This information may be used for fabric compatibility functionality 510 (described below).

Hot swap management functionality 506 may also be provided by the hardware management module 140. In one example, hot swap management functionality 504 enables hardware management module 140 to manage the hot swap process of one or more boards and/or components in an ATCA modular platform shelf and/or system. Boards and/or components can be received and coupled to an interface resident on a backplane or request for extraction at any point in time. In one implementation, this may include communication of various hot swap states to hardware management module 140. This communication may occur over a management bus (IPMB) within a backplane and then onto network 150 via communication links 114 or 124 or 134 or a combination of these communication links.

In one implementation, a hot swap state machine (not shown), as described in the ATCA specification, may be used for state transitions and communicating the hot swap states between a hardware management module 140 and the boards and/or components in modular platform system 100. This state machine may govern the process of insertion, extraction, activation, de-activation, and surprise extraction of boards and/or components.

In one example, power management functionality 508 is also provided by the hardware management module 140. Power management functionality 508 may include, determining a total amount of power available to boards and/or components for modular platform system 100 and monitoring power consumption of at least one of the boards and/or components. Power management functionality 508 may also include adjusting power consumption of at least one of the boards and/or components. For example, if the power consumption of the board and/or component rises above certain power consumption thresholds, power management functionality 508 reduces the power to that board and/or component.

In one implementation, power management functionality 508 may make a determination of the power available on a given modular platform shelf and/or the entire modular platform system. Power management functionality 508 may then assign a power budget to one or more boards and/or components, and maintain the power budget assignment at the modular platform shelf or system level.

In one example, FRU information related to one or more boards and/or components provide information on the total power available, the number of power feeds available, and which boards and/or components are powered by these feeds. This information may be used by power management functionality 508 to determine if there is enough power available in a given modular platform shelf and/or modular platform system. Power management functionality 508 based on this determination, may then enable each board or component received and coupled to a backplane within the modular platform system.

In one example, fabric compatibility functionality 510 is also provided by hardware management module 140. Fabric compatibility functionality 510 may determine signaling compatibility between boards received and coupled to interfaces on a backplane. This may include determining the signaling types (Ethernet, Infiniband, Fiber channel, PCI Express—Advanced Switching, Rapid IO, etc) and enabling the boards to communicate if the boards have compatible signaling types.

In one example, cooling management 512 is also provided by hardware management module 140. Cooling management 512 may ensure adequate cooling within each modular platform shelf and/or an entire modular platform system. This may generally include monitoring a thermal condition of each of a plurality of boards and/or components in the modular platform system, and adjusting a cooling component (e.g., fan 310 in modular platform shelf 120) in response to a thermal condition in excess of a thermal threshold level. For example, under normal operating conditions, every board and/or component coupled to management bus 350 in modular platform shelf 120 sends thermal condition information through backplane 126 to the hardware management module 140 via network 150. Based at least in part on the thermal condition information, cooling management 512 functionality of hardware management module 140 may take action to increase/decrease cooling to modular platform shelf 120 by sending IPMI commands to fan 310 to increase/decrease fan speeds.

In one example, bus monitoring functionality 514 is also provided by hardware management module 140. Bus monitoring 514 may be utilized to determine if the management bus in a given backplane is functioning normally. Referring again to management bus 350 of FIG. 3 management bus 350 may be divided into two segments. The first segment may be the part of management bus 350 coming out of a board controller 210 to the point where it enters backplane 126. The endpoint for this first segment may include a management bus isolator on a board (not shown). This first segment may be called the board side management bus. The second segment may be the backplane side management bus. As per the ATCA specification, an IPMC (e.g., board controller 210) on a board may be capable of determining the integrity of management bus on the board side, while hardware management module 140 may be capable of maintaining the integrity of the management bus on the backplane side. As such, hardware management module 140 may use functionality provided by the IPMC to execute one or more commands that determines the integrity of the management bus on both the first and second segments.

Figure 6:
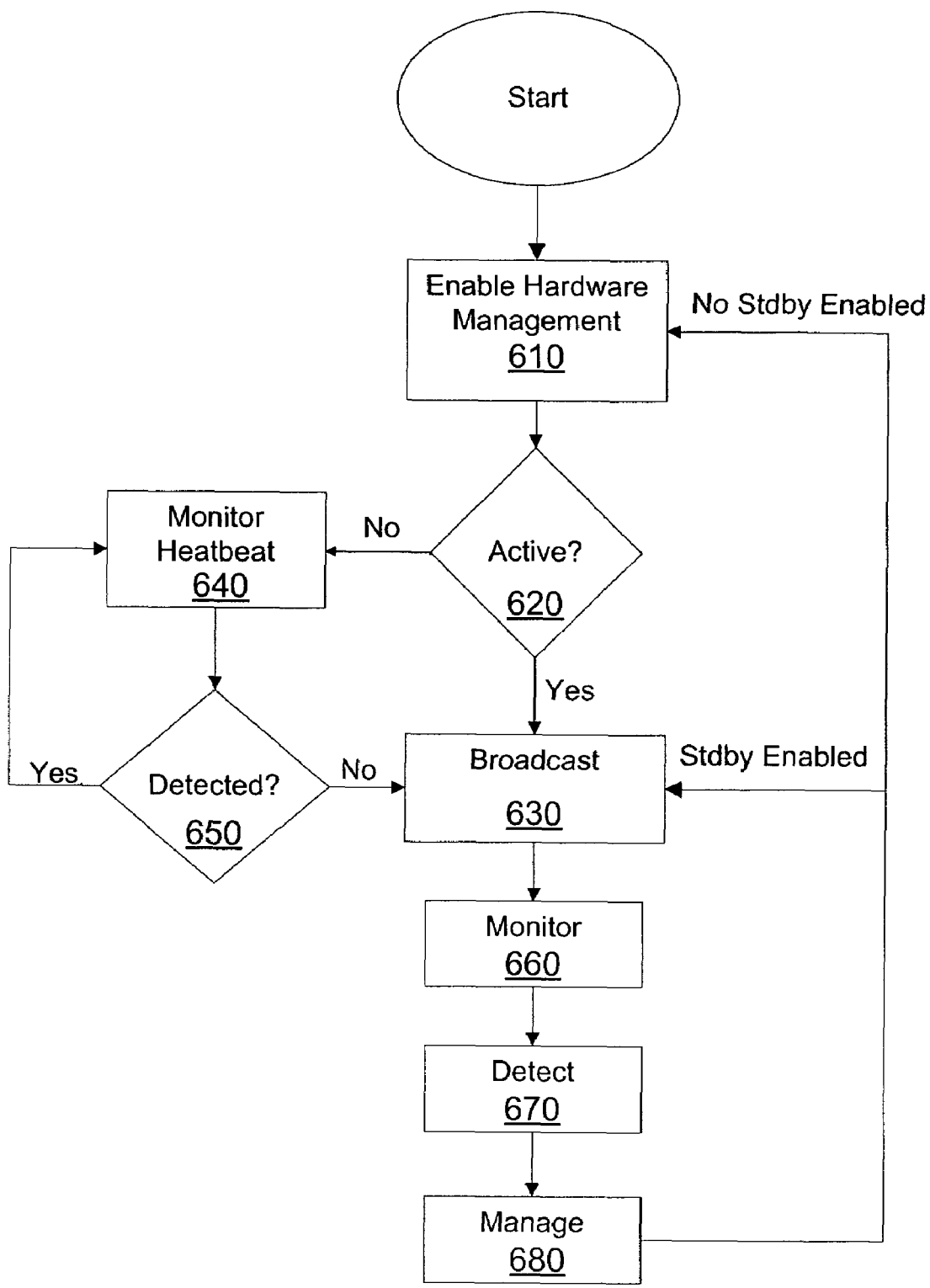
FIG. 6 is a flow chart of an example method to enable the hardware management module to perform hardware management for the modular platform system.

FIG. 6 is a flow chart of an example method to enable hardware management module 140 to perform hardware management for modular platform system 100. In this example method, modular platform system 100 operates and/or is designed to operate in compliance with the ATCA specification.

In block 610, according to one implementation, board management controller 210 on board 115*a*, as depicted in FIG. 3, receives (e.g. via network 150, or management bus 250) or accesses (e.g. in memory 245) a management policy. In one example, this policy is received or accessed upon board 115*a*'s coupling to a board interface on backplane 116. This policy may indicate to board management controller 210 that board 115*a* is to enable and/or support a hardware management module (e.g., hardware management module 140*a*) for modular platform system 100. This support may include supporting via a component resident on board 155*a* that includes an ASIC, FPGA, service processor, or the component is resident within another component such as processor 220, chipset controller 230, mezzanine card 240, board management controller 210 or resident within a combination or these components.

In block 620, the policy may also indicate whether board 115*a*'s hardware management module is to be the active or standby hardware management module for modular platform system 100. If active, in block 630, board 115*a* and/or hardware management module 140*a* may broadcast (e.g., via management bus 250 and/or network 150) it is the active hardware management module. The broadcast may be to other boards and/or components coupled to backplanes in modular platform system 100. Board 115*a* and/or hardware management module 140*a* may also broadcast a heartbeat (e.g., via management bus 250 and/or network 150) which indicates the health of board 115*a* and or hardware management module 140*a*. If standby, the process moves to block 640.

In block 640, a board that supports or has enabled a standby hardware management module (e.g., board 115*b*) may monitor the heartbeats broadcast by board 115*a* and/or hardware management module 140*a*. This broadcasted heartbeat may be at given time intervals as may be indicated in the management policy.

In block 650, as long as a board supporting a standby hardware management module detects a heartbeat, that board may continue to monitor for heartbeats. If a heartbeat is not detected or is delayed beyond a give threshold of time (e.g., due to a failure or malfunction in board 115*a*), the board may then become the supporter of the active hardware management module and the process moves to block 630. In one example, heartbeat monitoring criteria is included in the management policy.

In block 660, hardware management module 140*a* monitors board and/or component interfaces resident on backplanes 116, 126 and 136. In one implementation, hardware management module 140*a* may communicate with one or more NShMCs within modular platform shelves 120 and 130 via the communication links depicted in FIG. 1. This communication may facilitate hardware management module 140's monitoring of these board and/or component interfaces via the one or more NShMCs. The one or more NShMCs may be located within boards received and coupled to backplanes 126 and 136. Additionally, hardware management module 140*a* may monitor board and/or component interfaces on backplane 116 via management bus 250. Alternatively, hardware management module 140*a* may monitor board and/or component interfaces on backplane 116 through one or more NShMCs within boards received and coupled to backplane 116.

In block 670, for backplane 126 and 136, NShMCs may detect when a board and/or component is received and coupled to a board interface on these backplanes. NShMCs, for example, may relay any detections to hardware management module 140a. For backplane 116, hardware management module 140a may detect when a board and/or component is received and coupled to that backplane.

In block 680, hardware management module 140a performs one or more management functions on the board and/or component. The one or more management functions may include but are not limited to those management functions described above.

The process returns to block 660 if hardware management module 140a remains the active hardware management module.

The process starts over, for example, when hardware management module 140a is notified that it is no longer the active hardware management module or if hardware management module 140a becomes disabled and/or is unable to send heartbeats. If so, then another hardware management module becomes the active and the process either starts over at block 610 if a standby hardware management module is not yet enabled or at block 630 if a standby hardware management module is enabled.

Referring back to FIG. 2 and memory 245. Memory 245 may include a wide variety of memory media including but not limited to volatile memory, non-volatile memory, flash, programmable variables or states, random access memory (RAM), read-only memory (ROM), flash, or other static or dynamic storage media.

In one example, machine-readable instructions can be provided to memory 245 from a form of machine-accessible medium. A machine-accessible medium may represent any mechanism that provides (i.e., stores and/or transmits) information in a form readable by a machine (e.g., an ASIC, special function controller or processor, FPGA or other hardware device). For example, a machine-accessible medium may include: ROM; RAM; magnetic disk storage media; optical storage media; flash memory devices; electrical, optical, acoustical or other form of propagated signals (e.g., carrier waves, infrared signals, digital signals); and the like.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

References made in the specification to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in his regard.

What is claimed is:

1. A method for enabling management of a modular platform system, the method comprising:
   enabling a hardware management module to perform hardware management for the modular platform system that includes a plurality of modular platform shelves coupled via one or more communication links in a network, the hardware management including:
   monitoring board interfaces resident on one or more backplanes within the plurality of modular platform shelves;
   detecting when a detected board is received and coupled to a board interface; and
   performing one or more hardware management functions on the detected board, the one or more hardware management functions to include obtaining field replaceable unit information from the detected board;
   accessing a management policy by a board management controller for a board received and coupled to a board interface from among the board interfaces resident on the one or more backplanes, the management policy to indicate the board includes the hardware management module;
   indicating by the management policy that the board supports an active hardware management module; and
   broadcasting that the hardware management module on the board is the active hardware management module for the modular platform system, wherein the broadcast is made through the one or more communication links coupling the modular platform shelves in a network.

2. The method according to claim 1, wherein:
   the board supports the hardware management module with at least one component resident on the board, the at least one component selected from the following group of an application specific integrated circuit (ASIC), a field programmable gate array (FPGA), a board management controller, a processor, or a mezzanine card.

3. The method according to claim 2, wherein broadcasting further comprises:
   broadcasting heartbeats at given time intervals to indicate the status of the active hardware management module.

4. The method according to claim 3, wherein monitoring board interfaces resident on one or more backplanes within the plurality of modular platform shelves further comprises:
   communicating with a network enabled shelf management controller, the network enabled shelf management controller resident on a board received and coupled to a board interface resident on a backplane within a modular platform shelf from among the plurality of modular platform shelves, the communicating via a communication link coupling the modular platform shelf to the network;
   the network enabled shelf management controller facilitating the monitoring of board interfaces resident on the backplane in the modular platform shelf by the hardware management module.

5. The method according to claim 4, wherein facilitating the monitoring of board further comprises:
   the network enabled shelf management controller monitoring the board interfaces resident on the backplane in the modular platform shelf;
   the network enabled shelf management controller detecting when a board is received and coupled to the backplane in the modular platform shelf; and
   the network enabled shelf management controller relaying the detection to the active hardware management module.

6. The method according to claim 2, further comprising:
   indicating by the management policy that the board supports a standby hardware management module.

7. The method according to claim 6, further comprising:
   broadcasting that the hardware management module on the board is the standby hardware management module for the modular platform system, the broadcast through the one or more communication links coupling the modular platform shelves in a network.

8. The method according to claim 7, wherein broadcasting further comprises:
broadcasting heartbeats at given time intervals to indicate the status of the standby hardware management module.

9. The method according to claim 1, wherein performing one or more hardware management functions on the detected board to include obtaining field replaceable unit information from the detected board, further includes:
performing at least one hardware management function selected from the following group of board initialization, hot swap, power, fabric compatibility, cooling, or bus management.

10. The method according to claim 1, wherein the modular platform system operates in compliance with the Advanced Telecommunications Architecture (ATCA) specification.

11. An apparatus comprising:
a processor; and
a hardware management module responsive to the processor, the hardware management module to perform hardware management for a modular platform system that includes a plurality of modular platform shelves coupled via one or more communication links in a network, wherein to perform hardware management includes the hardware management module to:
monitor board interfaces resident on one or more backplanes within the plurality of modular platform shelves;
detect when a board is received and coupled to a board interface; and
perform one or more hardware management functions on the detected board, the one or more hardware management functions to include obtaining field replaceable unit information from the detected board,
wherein the processor is to access a management policy, the management policy to indicate that the processor is to support the hardware management module as an active hardware management module and to broadcast through the one or more communication links that the processor supports the active hardware management module and to broadcast heartbeats at given time intervals to indicate the status of the active hardware management module.

12. The apparatus according to claim 11, wherein the processor is resident on a board received and coupled to a board interface from among the board interfaces resident on the one or more backplanes.

13. The apparatus according to claim 11, wherein the hardware management module to monitor board interfaces further comprises the hardware management module to:
communicate with a network enabled shelf management controller, the network enabled shelf management controller resident on a board received and coupled to a board interface resident on a backplane within a modular platform shelf from among the plurality of modular platform shelves, the hardware management module to communicate via a communication link coupling the modular platform shelf to the network, the communication to direct the network enabled shelf management controller to:
monitor the board interfaces resident on the backplane in the modular platform shelf;
detect when a board is received and coupled to the backplane in the modular platform shelf; and
relay the detection to the active hardware management module.

14. The apparatus according to claim 13, wherein the hardware management module directs the network enabled shelf management controller to perform at least a portion of the one or more management functions.

15. The apparatus according to claim 13, wherein the modular platform shelf operates in compliance with the Advanced Telecommunications Architecture (ATCA) specification.

16. The apparatus according to claim 15, wherein the plurality of modular platform shelves include a base fabric within the one or more backplanes, the base fabric to use Ethernet communication protocols to forward management instructions, the base fabric further coupled to at least one of the one or more communication links in the network.

17. The apparatus according to claim 15, wherein the plurality of modular platform shelves include a management bus within the one or more backplanes, the management bus comprising an Intelligent Platform Management Bus (IPMB) operated in compliance with the IPMB standard, the IPMB bus further coupled to at least one of the one or more communication links in the network.

18. The apparatus according to claim 11, wherein the processor comprises the processor to access a management policy, the management policy to indicate that the processor is to support the hardware management module as a standby hardware management module.

19. The apparatus according to claim 18, further comprising the processor to:
broadcast through the one or more communication links an indication that the processor supports the standby hardware management module and to broadcast heartbeats at given time intervals to indicate the status of the standby hardware management module.

20. The apparatus according to claim 11, wherein to perform one or more hardware management functions on the detected board to include obtaining field replaceable unit information from the detected board, further includes the hardware management module to:
perform at least one hardware management function selected from the following group of board initialization, hot swap, power, fabric compatibility, cooling, or bus management.

21. A modular platform system comprising:
one or more communication links to a network;
a plurality of modular platform shelves coupled via the one or more communication links to the network;
one or more backplanes within each modular platform shelf;
a plurality of board interfaces resident on at least one backplane within each modular platform shelf; and
a board received and coupled to a board interface on a first backplane within a first modular platform shelf, the board including a hardware management module, the hardware management module to manage other boards received and coupled to board interfaces resident on the at least one backplane within each modular platform shelf, wherein the hardware management module is enabled to:
monitor the board interfaces;
detect when another board is received and coupled to another board interface; and
perform one or more hardware management functions on the other board, the one or more hardware management functions to include obtaining field replaceable unit information from the other board,
wherein the hardware management module monitors the board interfaces resident on the first backplane within the first modular platform shelf via a management bus in the first backplane and monitors the board interfaces resident on other backplanes within other modular platform shelves via the one or more communication links to the network, wherein the board further includes a board management controller to access a management policy, the management policy to indicate the board includes the hardware management module operating as an active hardware management module, the board to support the hardware management module with at least one component resident on the board, the at least one component selected from the following group of an application specific integrated circuit (ASIC), a field programmable gate array (FPGA), a board management controller, a processor, or a mezzanine card.

22. The modular platform system according to claim 21, wherein the hardware management module to monitor the board interfaces resident on the other backplanes communicates with one or more network enabled shelf management controllers, each network enabled shelf management controller resident on a board received and coupled to a board interface resident on the other backplanes, the hardware management module to communicate via the one or more communication links to the network, the communication to direct each network enabled shelf management controller to:

monitor the board interfaces resident on the backplane within a given modular platform shelf;

detect when a board is received and coupled to the backplane in the given modular platform shelf; and relay the detection to the hardware management module.

23. The modular platform system according to claim 21, wherein to perform one or more hardware management functions on the other board to include obtaining field replaceable unit information from the other board, further includes the hardware management module to:

perform at least one hardware management function selected from the following group of board initialization, hot swap, power, fabric compatibility, cooling, or bus management.

24. The modular platform system according to claim 21, wherein the plurality of modular platform shelves operate in compliance with the Advanced Telecommunications Architecture (ATCA) specification.

25. The modular platform system according to claim 24, wherein the plurality of modular platform shelves include a base fabric within the one or more backplanes within each modular platform shelf, the base fabric to use Ethernet communication protocols to forward management instructions from the hardware management module, the base fabric further coupled to at least one of the one or more communication links to the network.

26. A machine-accessible storage medium comprising a program, which, when executed by a machine causes the machine to:

enable a hardware management module to perform hardware management for a modular platform system that includes a plurality of modular platform shelves coupled via one or more communication links in a network, wherein the hardware management module is included on a board coupled within a first modular platform shelf of the modular platform system, wherein to perform hardware management includes the hardware management module to:

monitor board interfaces resident on one or more backplanes within the plurality of modular platform shelves;

detect when a board is received and coupled to a board interface; and perform one or more hardware management functions on the detected board, the one or more hardware management functions to include obtaining field replaceable unit information from the detected board, wherein the hardware management module monitors the board interfaces resident on a first backplane within the first modular platform shelf via a management bus in the first backplane and monitors the board interfaces resident on other backplanes within other modular platform shelves via the one or more communication links to the network, wherein the board coupled within the first modular platform shelf includes a board management controller to access a management policy, the management policy to indicate the board includes the hardware management module operating as an active hardware management module, the board to support the hardware management module with at least one component resident on the board, the at least one component selected from the following group of an application specific integrated circuit (ASIC), a field programmable gate array (FPGA), a board management controller, a processor, or a mezzanine card.

27. The machine-accessible storage medium according to claim 26, wherein to perform at least one hardware management function comprises at least one hardware management function selected from the following group of board initialization, field replaceable unit (FRU) information, hot swap, power, fabric compatibility, cooling, or bus management.

* * * * *